United States Patent [19]

Sedlmair

[11] Patent Number: 4,640,524
[45] Date of Patent: Feb. 3, 1987

[54] SKI BINDING WITH SCREW RETAINING CONSTRUCTION

[75] Inventor: Gerhard Sedlmair, Farchant, Fed. Rep. of Germany

[73] Assignee: Marker International, Salt Lake City, Utah

[21] Appl. No.: 810,289
[22] PCT Filed: Apr. 3, 1985
[86] PCT No.: PCT/EP85/00150
 § 371 Date: Dec. 3, 1985
 § 102(e) Date: Dec. 3, 1985
[87] PCT Pub. No.: WO85/04695
 PCT Pub. Date: Oct. 24, 1985

[30] Foreign Application Priority Data

Apr. 4, 1984 [DE] Fed. Rep. of Germany ... 8410539[U]

[51] Int. Cl.⁴ ............................................. F16B 39/00
[52] U.S. Cl. ................... 280/611; 411/337; 411/352; 411/999
[58] Field of Search ............... 411/337, 352, 353, 360, 411/999; 280/611, 617

[56] References Cited

U.S. PATENT DOCUMENTS 3,561,075 2/1971 Selinko .......................... 411/999 X

FOREIGN PATENT DOCUMENTS 1207154 12/1965 Fed. Rep. of Germany .
1171209 5/1974 Fed. Rep. of Germany .
2378201 8/1978 France .
 512923 11/1971 Switzerland .
2093552 9/1982 United Kingdom .

Primary Examiner—John J. Love
Assistant Examiner—Michael Mar
Attorney, Agent, or Firm—D. Peter Hochberg

[57] ABSTRACT

A screw retainer for retaining a screw in a first member which is to be attached to a second member, including a bore in the first member having longitudinally spaced elastic projections extending into the path of the screw head to capturing the screw head to retain the screw in the bore before the first and second members are attached.

12 Claims, 4 Drawing Figures

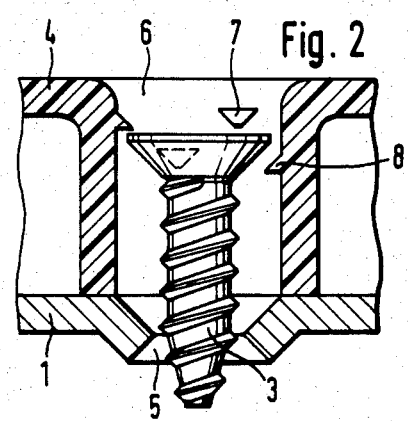
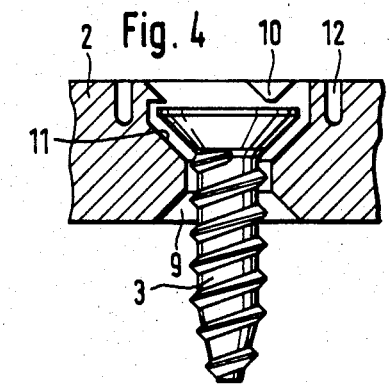
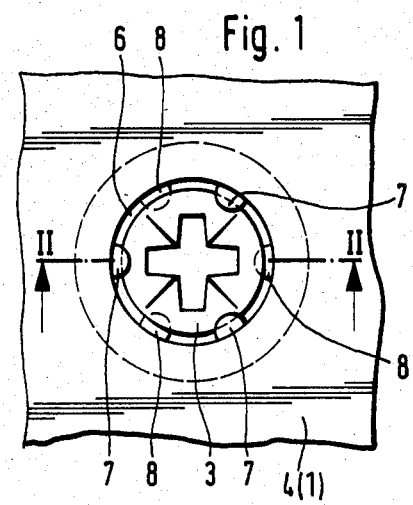
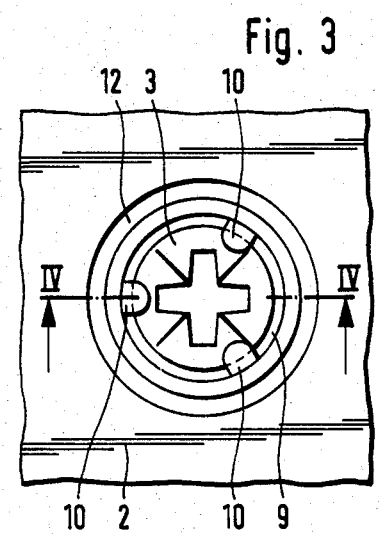

SKI BINDING WITH SCREW RETAINING CONSTRUCTION

BACKGROUND OF THE INVENTION

The invention relates to ski bindings, and in particular to a ski binding wherein one structural member is attachable to another member by means of a screw which is inserted into a screw hole, wherein means are provided for preventing the screw from falling out of the one member prior to the securing of the screw in both members.

Known devices of this kind make use of a resilient spring element which is mounted on the structural members and extends parallel to the screw hole. Leaf springs are often used for this purpose. The area in which these known devices may be used is rather limited and depends largely on the shape of the structural members inasmuch as the spring element has to project with respect to the head of the screw in relation to the final position of the screw which is screwed into the object in question.

SUMMARY OF THE INVENTION

An object of the invention is to provide an improved ski binding having one member attachable to another member by a screw, wherein the screw is retained in the one member.

Another object is to provide a screw receiving member which prevents the inadvertent withdrawal of a screw from the member.

A further object is to provide a ski binding having first and second members attachable by a screw, wherein means are provided in the first member for retaining the screw in place in an economical, effective and efficient manner.

To achieve these objects, the invention in its preferred forms provide for a hole or bore adapted to receive the head of the screw, this hole being provided at its entrance end with tongue shaped resilient projections. These projections extend from an outer wall defining the bore into the perimeter of an imaginary inner circle, the diameter of which is somewhat smaller than the diameter of the head of the screw. In other words, the projections extends into the projected area of a screw head in the bore. When using a certain amount of pressure it is possible to pass the head of the screw by the elastic resilient projections and into said hole with the consequence that it cannot fall out of the hole prior to mounting on said structural member. In this condition prior to mounting the screw is movable in a longitudinal direction to a larger or lesser degree depending on the depth of the hole.

In accordance with a modification of the invention, the projections are arranged in one of two members having a hole coaxial a screw hole in the second member. The one member is supported on the upper side of the second member. This design is particularly preferable if the structural members have the shape of a plate.

In accordance with another embodiment which is particularly applicable when the hole receiving the head of the screw is deeper than the length of the head, a second row of corresponding resilient projections is provided below the first row. A distance is provided between the two rows, so that the two sets of projections are longitudinally spaced from each other by at least the length of the head of the screw. By this construction, the longitudinal movement of the screw within the structural member prior to its mounting is avoided. Particularly for reason of manufacture it is desirable to offset the projection of the second row with respect to the projections of the first row in a circumferential direction.

BRIEF DESCRIPTION OF THE DRAWINGS

These and other objects and advantages of the present invention will be disclosed in conjunction with the accompanying drawings in which:

FIG. 1 is a partial plan view of a preferred embodiment of the invention;

FIG. 2 is a sectional view along line II—II in FIG. 1;

FIG. 3 is a plan view similar to the plan view of FIG. 1 showing a second embodiment of the invention; and FIG. 4 is a sectional view along line IV—IV in FIG. 3.

DESCRIPTION OF THE PREFERRED EMBODIMENTS

The two embodiments shown relate to a base plate 1 and 2 respectively of a ski binding part of any kind. Therefore, the entire ski binding part is not shown. The base plates are intended to be fixedly mounted by means of screws 3 on a ski which is not shown. The ski is provided with bores for receiving the screws. The screws for instance are comemrcial type screws of the type intended to be inserted into sheet metal.

In the embodiments of FIGS. 1 and 2 the base plate supports an additional part 4 which forms a pedal for the rear portion of the sole of a ski boot. The base plate is made of sheet metal while the additional part preferably is made of plastic material. The additional part of one member is fixedly mounted to the base plate or second member and comprises for each of the screw holes 5 of the base plate 1 a coaxially arranged screw hole or bore 6. At the end of the screw hole 6 where the screws are intended to be inserted three tongue shaped projections 7 are provided with end at the perimeter of an imaginery inner circle. Projections 7 have a relatively large base at the juncture with the outer wall from which they taper to a small free end. The diameter of said inner circle is somewhat smaller than the diameter of the head of the screw 3. In other words, each projection 7 extends from the outer wall defining bore 6 into the bore in the projected area of the head of a screw in the head receiving portion of the bore. Due to the inherent elasticity of the material it is possible to move the screw with its head past projections 7 when applying sufficient pressure. Spaced below projections 7 are arranged three additional elastic projections 8 with the distance between projections 7 and 8 being approximately equal to the length of the head of the sheet metal screw 3. FIG. 1 shows that the projections 7 are offset in the circumferential direction (i.e. angularly offset) with respect to each other.

As is shown in FIG. 2 the head of screw 3 is supported between the projections. Therefore, if for instance the screws are inserted by a machine, they can be held in the desired position and be movable only by a limited amount and be held such that they cannot be lost. After base plate 1 is positioned on the ski, screw 3 is moved with its head past the projections 8 while again applying a slight amount of pressure, and the screws are then screwed into the bores of the ski.

The embodiment shown in FIGS. 3 and 4 comprises the previously mentioned base plate 2. This base plate again is provided with screw holes, one of which is shown and designated 9. In screw hole 9 again three tongue like projections 10 are provided at the side from which the screw is inserted. The projections 10 are spaced from a shoulder 11 with the spacing corresponding to the length of the head of screw 3. Shoulder 11 is used as a support surface for the screw head so as to hold the base plate on the ski after the screws are screwed into the ski. Therefore, also with this embodiment of the invention the prearranged screws are held in the base plate such that they cannot be lost.

So as to achieve a good elasticity of the projections 10 to embodiment of FIGS. 3 and 4 uses an annular groove 12 which is provided around the screw hole 9 in the upper area of hole 9.

The invention has been described in detail with particular emphasis on the preferred embodiments, but it should be understood that variations and modificatons within the spirit and scope of the invention may occur to those skilled in the art to which the invention pertains.

I claim:

1. A screw retainer for retaining a screw having an enlarged head with a predetermined diameter in a first member which is to be attached to a second member, such as a ski binding part and a base plate, by means of said screw retainer, said screw retainer comprising: an outer wall in the first member defining a longitudinal bore having an outer entrance and a head receiving portion with a diameter larger than the diameter of the head of the screw, at least one first elastic projection near said entrace extending from said outer wall into said bore in the projected area of the head of a screw in said head receiving portion for blocking the withdrawal of a screw whose head is in said head receiving portion, and at least one second elastic projection spaced longitudinally inwardly from said first projection by at least the length of the head of the screw and extending from said outer wall into said bore in the projected area of a screw head in said head receiving portion, said first and second projections being adapted to bend away from said entrance to permit entry of the screw head into said bore past said projections and to resist removal of the screw from said bore by engaging the top of the screw head, and said first and second projections being further adapted to retain a screw head between said first and second projections in the first member prior to attachment to the second member.

2. The invention according to claim 19 wherein said at least one first projection comprises a plurality of said first projections equiangularly spaced around said bore.

3. The invention according to claim 2 and further characterized in that there are a plurality of said second projections equiangularly spaced around said bore and longitudinally spaced from the first projections by at least the length of the head of the screw.

4. The invention according to claim 3 and further characterized in that said first member further includes an annular groove around said entrance for enhancing the elasticity of said projections.

5. The invention according to claim 2 wherein said second projections taper from a large base at said outer wall to a narrow free end in said bore.

6. The invention according to claim 2 and further including an annular groove around said entrance for enhanceing the elasticity of said projections.

7. The invention according to claim 1 wherein said projections taper from a large base at said first wall to a narrow free end in said bore.

8. The invention according to claim 7 and further characterized in that said first member further includes an annular groove around said entrance for enhancing the elasticity of said projections.

9. The invention according to claim 1 wherein said first projection and said second projection are angularly offset from each other.

10. The invention according to claim 9 wherein said projections taper from a large base at said outer wall to a narrow free end in said bore.

11. The invention according to claim 9 and further including an annular groove around said entrance for enhancing the elasticity of said projections.

12. The invention according to claim 1 and further including an annular groove around said entrance for enhancing the elasticity of said projections.

* * * * *